Feb. 8, 1966          M. J. CEGLIA          3,234,376
GLARE-FREE LIGHTING FIXTURE
Filed Feb. 11, 1963          6 Sheets-Sheet 1
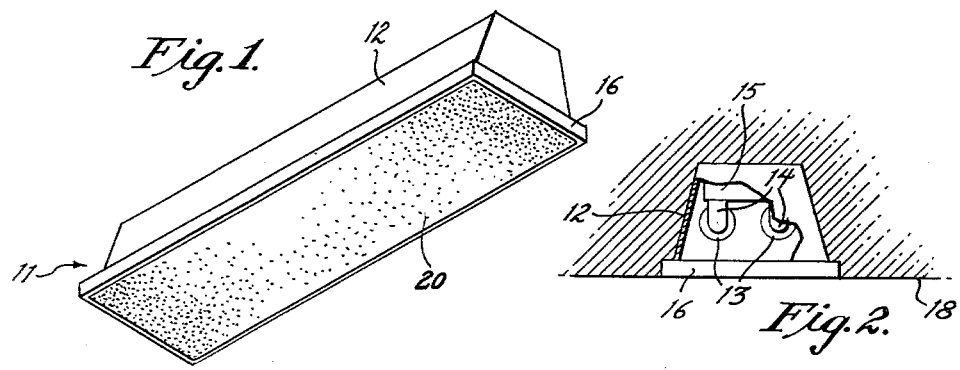
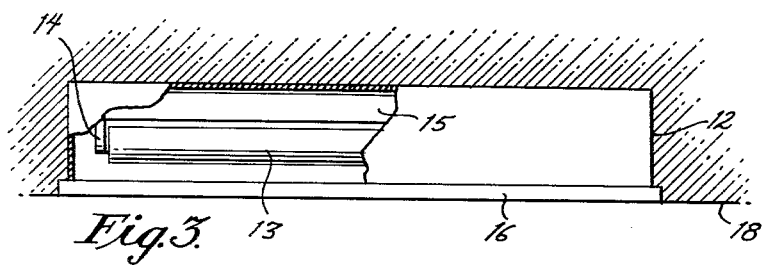
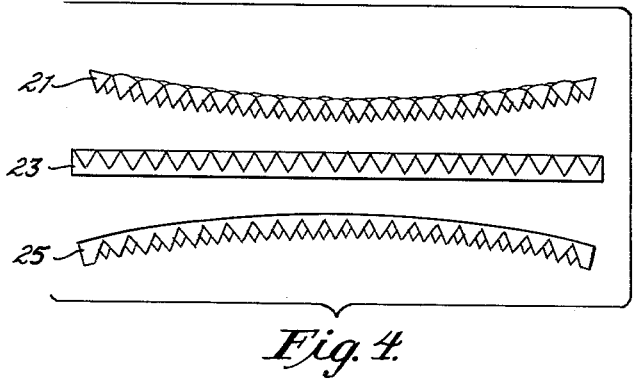
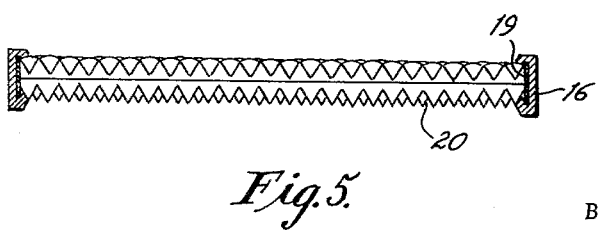
INVENTOR.
MICHAEL J. CEGLIA
BY
Charles A. McClure
ATTORNEY.

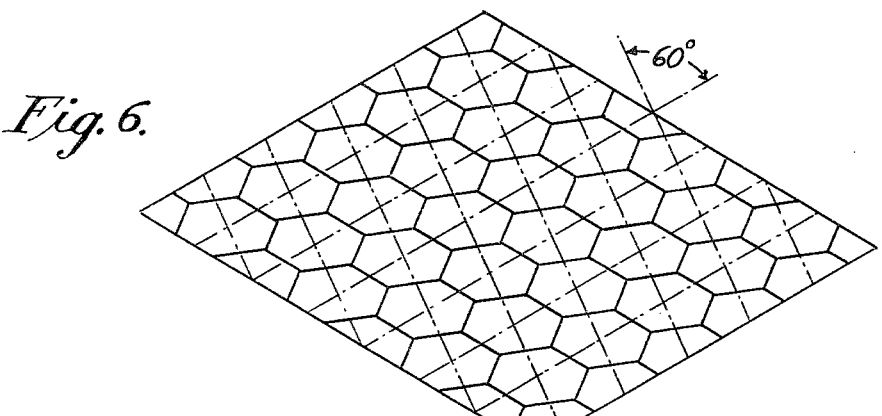
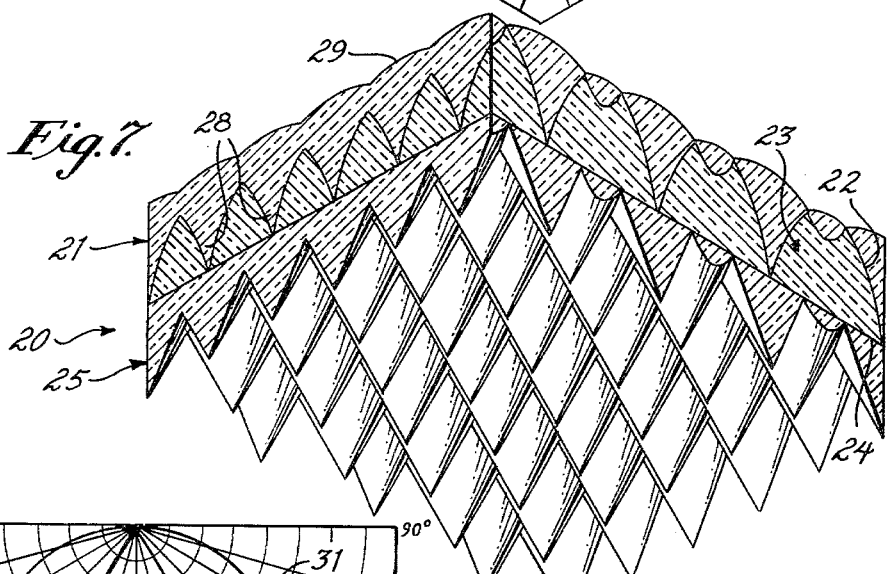
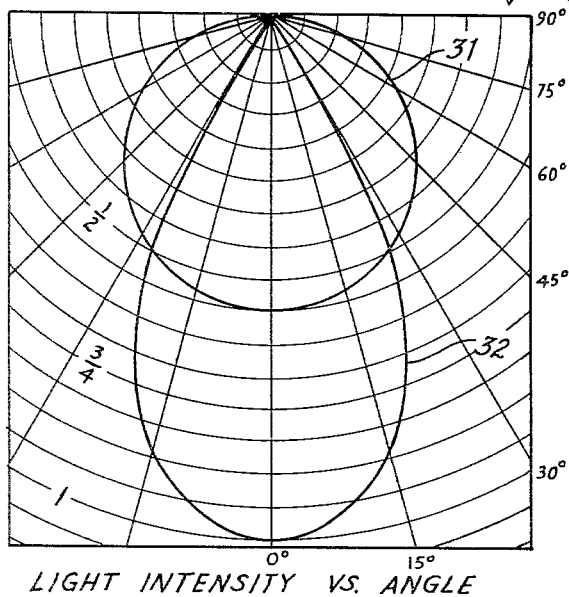
LIGHT INTENSITY VS. ANGLE
Fig. 8.
INVENTOR.
MICHAEL J. CEGLIA INVENTOR.
MICHAEL J. CEGLIA
BY
Charles A. McClure
ATTORNEY.

Feb. 8, 1966 M. J. CEGLIA 3,234,376
GLARE-FREE LIGHTING FIXTURE
Filed Feb. 11, 1963 6 Sheets-Sheet 6

INVENTOR.
MICHAEL J. CEGLIA
BY
*Charles A. McClure*
ATTORNEY.

United States Patent Office 3,234,376
Patented Feb. 8, 1966

3,234,376
GLARE-FREE LIGHTING FIXTURE
Michael J. Ceglia, 1008 Abington Terrace,
Haddonfield, N.J.
Filed Feb. 11, 1963, Ser. No. 257,387
24 Claims. (Cl. 240—106)

This invention relates to illumination of rooms or similar areas and concerns particularly directional light-transmitting devices of prismatic or refractive type.

The principal objective of lighting offices and other work areas in commercial and industrial establishments and in the home and recreation areas is to improve visibility; however, much of the applied light actually impairs visibility because it enters the eye directly from the lighting fixture or is reflected in a glaring fashion from some object in the path of the light. Attempts to provide glare-free or glareless lighting usually have taken the form of diffusing or scattering the light so that there is little likelihood that any large amount will enter the eye directly or by such reflection, but this is wasteful and results in a generally low level of illumination. Attempts to increase the useful light level by directing the light rather than diffusing it have not been satisfactory, usually because of being insufficiently or wrongly directional. When satisfactory directioning is attained a great deal of the light is prevented from getting through the directional system from the source.

A primary object of the present invention is glare-free lighting.

A specific object is provision of novel directional light-transmitting devices of prismatic or refractive type containing non-refracting critical surfaces or interfaces.

Another object is minimizing of surface brightness of the external light-transmitting surface of luminaires provided therewith.

A further object is maximizing of light transmission of such luminaires.

Other objects of this invention, together with means and methods for attaining the various objects, will be apparent from the following description and the accompanying diagrams.

FIG. 1 is a perspective view of a lighting fixture or luminaire;

FIG. 2 is an end elevation (partly cut away) of the fixture of FIG. 1;

FIG. 3 is a side elevation (partly cut away) of the fixture of the preceding views;

FIG. 4 is a side elevation, partly in section, of disassembled components of the light-transmitting portion of the same fixture, on a somewhat larger scale; and FIG. 5 is a side elevation, partly in section, of the same components assembled.

FIG. 6 is a projection, with schematic overlay, of the light-transmitting assembly shown in perspective in the next view;

FIG. 7 is a perspective (on an enlarged scale) of a light-transmitting assembly of this invention sectioned along its visible side edges and viewed from below; and FIG. 8 is a schematic representation of photometric illumination curves for conventional opal white flat plastic diffuser and for a light-transmitting assembly of this invention.

Figure 9:
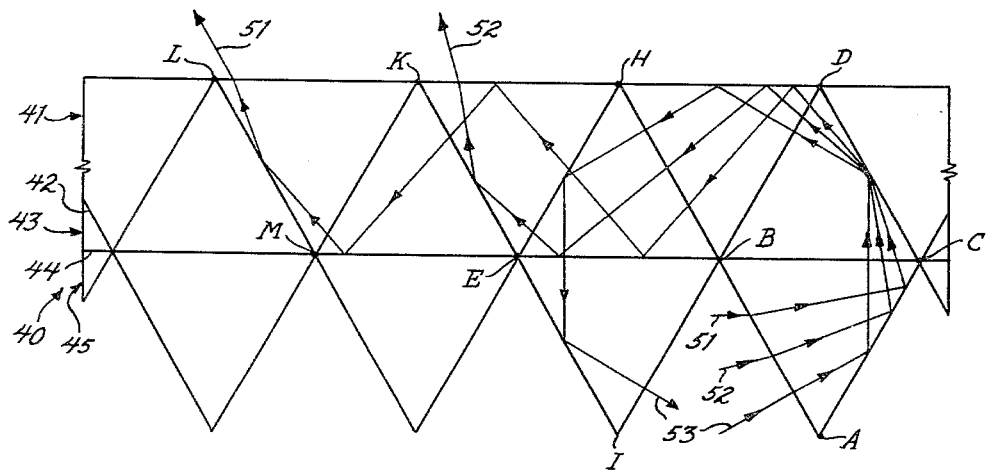
FIG. 9 is a schematic representation of one form of light-transmitting assembly illustrating certain refractive and reflective action thereof.

In general the objects of the present invention are accomplished, in an article of manufacture for use with a light source, by means of a multiplicity of light-refracting elements, including three elements located sequentially with respect to the source, one being closest thereto, another being furthest therefrom, and the other being intermediately located and having its opposite surfaces juxtaposed to adjacent surfaces of the other two elements, the adjacent surfaces of the first and intermediate elements being in mating engagement with one another. An interface pair is defined by each two juxtaposed element surfaces such that essentially all light incident upon the interior surface of either adjacent element at an angle with respect to a perpendicular thereto less than the critical angle therein is transmitted essentially unaffected across the interface pair and into the other adjacent element, and essentially all light incident thereon at an angle greater than the critical angle is reflected back into the interior. The light-transmitting assembly so constructed is useful with both fluorescent and incandescent light sources and normally will form the light-transmitting component of a lighting fixture or luminaire.

FIGS. 1, 2, and 3 show in perspective, end elevation, and side elevation, respectively, lighting fixture or luminaire 11, comprising housing or troffer 12 containing pair of tubular lamps 13 supported at their ends by supports 14 adapted to receive and retain pins (not shown) protruding from the lamp ends. The supports are carried on channel 15 (shown with its end closed) containing such wiring and other paraphernalia (not shown) as may be required. Collar 16 surrounds the edges of light-transmitting component or assembly 20, which covers the bottom of the fixture, flush with ceiling or wall surface 18.

FIGS. 4 and 5 show, in side elevation (partly in section) and enlarged over the scale of the preceding views, light-transmitting component or assembly 20 of this invention in greater detail. Upper layer 21, intermediate layer 23, and lower layer 25 are retained together by collar 16 and adjacent adhesive 19. Before assembly upper layer 21 and lower layer 25 preferably have a bowed configuration, being concave upward and downward, respectively, as in FIG. 4, and suitably resilient. This will tend to maintain the adjacent faces of the separate layers contiguous when assembled and retained at their peripheral edges, as in FIG. 5. The structure of these layers is shown in greater detail in subsequent views.

FIG. 6 shows, as a projection upward onto a plane surface, and with a schematic overlay, the layout of light-transmitting assembly 20 shown in perspective from below and with its side edges sectioned in FIG. 7. The hexagonal gridwork apparent in FIG. 6 is a projection of the lines of intersection of adjacent prismatic elements of upper layer 21 of the assembly. The overlay of broken lines intersecting one another at an angle of sixty degrees denotes at their intersections the centers of such elements, at the centers of the respective hexagons. As indicated at the upper or near left edge of FIG. 6, the assembly of FIG. 7 is sectioned at the corresponding edge along such a line of centers. On the other hand the upper or near right edge of FIG. 6 indicates sectioning of the corresponding edge of the assembly in FIG. 7 on a line of intersection of adjacent prismatic elements (in the same layer).

As is apparent from FIG. 7, the lower surface of lower layer 25 is composed of a multiplicity of identical conical elements 27 oriented apex downward. The upper surface of the lower layer and the adjacent lower surface of intermediate layer 23 are flat or planar and are contiguous. Inasmuch as these respective adjacent surfaces remain separate from one another despite their close juxtaposition, interface 24 (or, more properly, double interface or interface pair) intervenes, which has the property of critical reflection, i.e., reflecting (instead of transmitting) essentially all light rays incident thereon in either layer at an angle (measured with respect to a perpendicular thereto) greater than the critical angle in the medium of which the layer is composed. Because of this close juxtaposition, a minimal amount of displacement occurs as a light ray (incident at an angle smaller than the critical angle) crosses such an interface so that it may be deemed essentially non-refracting, as well.

Upper layer 21 is rather similar to the lower layer, having downwardly projecting conical elements 28; however, the sides of these conical elements are curved (instead of straight, as are the sides of conical elements 27 of lower layer 25) in a vertical plane through their apexes, and upper surface 29 of the upper layer is not flat but rather undulating. Intermediate layer 23 essentially fills the space between the upper and lower layers, providing another critically reflecting continuum, interface 22, which follows the contour of the lower face of the upper layer as defined by the multiplicity of conical elements 28. In practice the interfacial continuum between each pair of adjacent layers will be occupied by air, although it could be evacuated or filled with an inert gas (or other transparent medium having an index of refraction remote from that of the material composing the light-transmitting layers).

FIG. 8 shows graphically comparative photometric patterns for a conventional opal white flat plastic diffuser and for a light-transmitting assembly of the present invention as just shown and described. The plot is of light intensity (constant level) vs. angle (measured from the nadir). Conventional pattern 31 is a circle intersecting the origin, whereas pattern 32 obtained according to this invention resembles an elongated teardrop extending nearly twice as far in the vertical direction and entirely contained between the thirty-degree lines. This graphical representation, though approximate and somewhat idealized in the regularity of the contour indicates that the present invention places much more light in the useful non-glare area (eliminating essentially all light from the glare area), which is characterized by low angles with respect to the vertical.

The actual operation of the light-transmitting assembly of this invention will be better understood by reference to the succeeding views, which show schematically the structure already shown, as well as successive approximations of or approaches to it, and depicts the action thereof on various light rays. It will be understood that the location of the light source (not shown) is above the diagrams, and the location of the viewer is below. A light ray originating above the assembly may be replaced by a line of sight originating below the assembly, and vice versa. All angles are measured with respect to the nadir (i.e., as they depart from vertically downward) except angles of inclination (which by definition are referred to the horizontal). It is assumed that the respective layers have identical compositions (or, at least, identical—or very nearly so—indices of refraction). Preferred for use at ambient temperatures not greatly in excess of room temperatures are resilient plastic materials, such as acrylic plastics (e.g., methyl methacrylate) certain of which are sold under brand names such as "Lucite" and "Plexiglas" having an index of refraction of about 1.5, giving a critical angle of about forty degrees. Glass or other suitably heat resistant materials may be used similarly at high ambient temperatures.

FIG. 9 shows schematically simplified light-transmitting assembly 40, comprising upper layer 41, intermediate layer 43, and lower layer 45, with zigzag or saw-tooth-shaped non-refracting, critically reflecting interface 42 between the upper and intermediate layers and flat non-refracting, critically reflecting interface 44 between the intermediate and lower layers. Each layer presents in this schematic view (corresponding to a sectional elevation) a multiplicity of equilateral triangles, all the triangles being of equal size, those of the intermediate and lower layers being juxtaposed base to base, and those of the upper layer being oriented apex downward with their sides juxtaposed to those of the intermediate layer. (It will be understood that the corresponding solid surfaces would be conical, i.e., surfaces of revolution about the vertical). Thus, for example, triangles ABC and BEI are in lower layer 45, triangles BCD and BEH in the intermediate layer, and triangles BDH and EHK in the upper layer.

Although not specifically shown, in this construction (FIG. 9) all sight lines entering the light-transmitting assembly within thirty degrees of the nadir will emerge above the assembly, at inclination angles primarily about sixty to zero degrees, some of them having been totally reflected (internally) at a side of one of the elements in the lower or intermediate layers, as well as refracted upon entering (and leaving) the assembly, and others having passed through the assembly and been subjected to refraction only. Also not shown, many sight lines within the range of thirty to ninety degrees will be reflected at one of the horizontal surfaces, either the interface between the lower and intermediate layers or the top surface of the upper layer. To this extent, therefore, light from the source may occupy the range of angles within thirty degrees (from one side of the nadir to the opposite side) but not the angular range from thirty to ninety degrees. However, certain of the lines of sight in the latter range can get through the assembly to the source, indicating that some light from the source can emerge within this range to produce glare.

FIG. 9 shows certain of those undesired (because not rejected by the assembly) sight lines within the range of sixty to ninety degrees. Representative sight lines 51 (at 90°), 52 (at 75°), and 53 (at 60°) enter side AB of triangular element ABC in the lower layer, are reflected from side AC, CD (a part of interface 42) and segment DH (of the top surface), passing through interface 44 at BC and through interface 42 at BD and BH in succession. Line 53 then is reflected from segment EH of interface 42 and from side EI of an adjacent element in the lower layer, firmly emerging (at 60°) through side BI thereof. However, lines 51 and 52 both get through the top of the assembly to the light source (not shown): 52 (at 15°) through top segment HK after further reflection at BE of interface 44 and EK of interface 42; and 51 (at 30°) through KL after successive reflection at BE, HK, EM (another segment of interface 44), and LM (a segment of interface 42). If lines 51 and 52 were reflected from segment DH of the top surface to segment EH of interface 42 (as was line 53) they would follow essentially the same path as line 53 and be rejected by the assembly as desired; the next view shows how this is accomplished.

Figure 10:
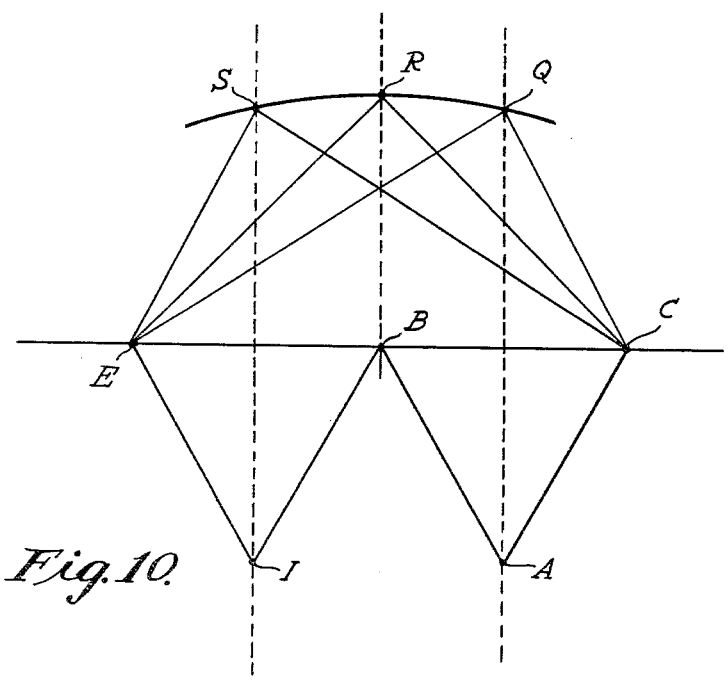
FIG. 10 is a schematic representation of a step in the redesign of the light-transmitting assembly of FIG. 9.

FIG. 10 shows schematically certain modification of the assembly shown schematically in the last preceding view. It contains triangular elements ABC and BEI of the lower layer as in FIG. 9, but the triangular elements of the intermediate and upper layers are omitted. Point R is located on a vertical line (shown broken) extending vertically through B, i.e., perpendicular to straight (horizontal) line CBE, with distance BR equal to distance BC (or CE). A segment of an ellipse having foci at C and E is constructed through R by any suitable method. Inasmuch as the total distance from the respective foci to any point P (not shown) on the ellipse must be invariant and, thus, equal to $CR+ER$, points Q and S satisfying that requirement may be located on vertical lines (shown broken) through apexes A and I of the original triangular elements. The standard equation for such ellipse (with origin at B) is $X^2/2s^2+y^2/s^2=1$, where $s$ is a segment length equal to BR (or BC or BE). It will be apparent that lines incident on elliptical segment QRS from any portion of CQ above C will have even larger angles of incidence (than a line along CQ) and, therefore, will be reflected to ES (rather than to the opposite focus, E) as desired. The angle of incidence of CQ (or ES) on elliptical segment QRS is about forty-one degrees, exceeding the stipulated critical angle of about forty degrees by a safe margin. The angle of inclination of the elliptical segment at Q (or S) is about fifteen degrees.

Figure 11:
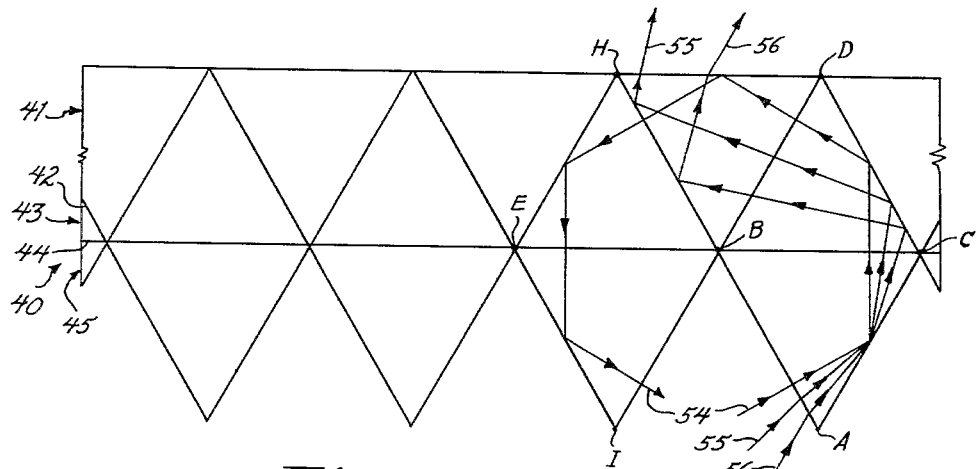
FIG. 11 is a further schematic representation of the form of light-transmitting assembly shown in FIG. 9 illustrating certain other refracting and reflecting action thereof.

FIG. 11 shows additional unrejected sight lines, within the range of thirty to sixty degrees, being structurally like FIG. 9. Representative sight lines 54 (at 60°), 55 (at 45°), and 56 (at 30°) enter side AB of triangular element ABC in lower layer 45 and are reflected from side AC and segment CD of interface 42, passing in the meantime through segment BC of interface 44 and subsequently through segment BD of interface 42. Line 54 then is reflected at the top (segment DH) passes through segment BH of interface 42, is reflected at segment EH of the same interface, passes through segment BE of interface 44, is reflected from side EI of an adjacent triangular element in the lower layer, and emerges through side BI thereof, which is satisfactory. However, lines 55 and 56 both are reflected from segment BH of interface 42 (which line 55 passed through) and emerge through the top (segment DH) toward the light source (not shown), which is unsatisfactory because it indicates that some of the light from the source is transmitted by the assembly to appear at angles in the glare range. If lines 55 and 56 could be reflected upon their first contact with interface 42 to intersect the top of the upper layer (segment DH), as line 56 does, they also would be rejected by the assembly, as desired. The next view shows the solution of this problem in the light-transmitting assembly first illustrated.

Figure 12:
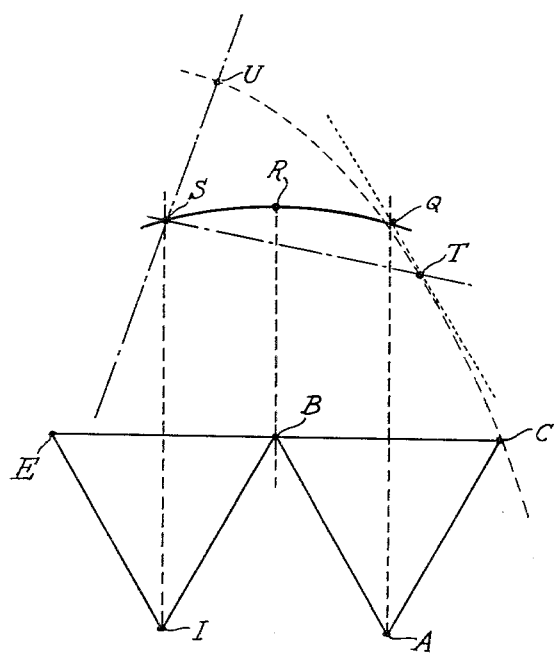
FIG. 12 is a schematic representation of a further step in the redesign of the same light-transmitting assembly.

FIG. 12 shows schematically certain modification of the assembly shown schematically in FIG. 10. Lines sloping downward to the right are constructed through points S and Q at inclination angles of about eleven degrees and sixty degrees, respectively, intersecting at point T. The first of these lines has the same inclination as sight line 56, upon reflection from side CD, which represents the furthest departure in FIG. 11 from the desired direction; the segment QT is not involved in the undesired transmission sought to be eliminated and, therefore, retains the original inclination of CQ in FIG. 10. Another line is constructed through S, this one sloping upward to the right at an angle of inclination equal to that of sight line 51 (the 90° or horizontal line) of FIG. 9 upon its first reflection (from side AC) after entering the assembly (i.e., about one hundred nine degrees). Point U is determined on this last mentioned line at a distance QU approximately two-thirds the length of BR (or BC or BE); this fractional distance may be expressed more precisely as one-seventh the square root of twenty-one, derived as a matter of geometry from the fact that the desired shape of reflecting surface or interface between C and T is a parabola, which must pass also through point U, where it is perpendicular to line SU, point S being the focus of the parabola. The inclination of this parabola at point C is about seventy degrees. The equation of this parabola may be simplified by rotating FIG. 12 counterclockwise until SU is vertical and locating the origin at S, whereupon it will be $$x^2=-(4/7)(21)^{1/2}sy$$

where $s$ is the segment length BR (or BC or BE) as before.

Figure 13:
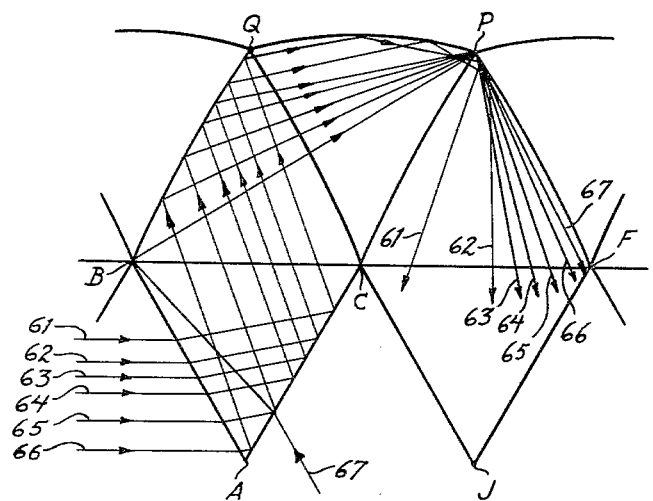
FIG. 13 is a schematic representation of the resulting further redesign.

FIG. 13 shows schematically (similarly to a sectional elevation on a medial plane through a row of the conical elements of the lower layer, for example) the resulting configuration of light-transmitting assembly. This view also shows the action thereof on a half dozen 90° sight lines 61 to 66 (zero inclination) on side AB of triangular element ABC of the lower layer and upon 30° sight line 67 on side AC thereof. It will be apparent that all these lines, which are terminated heading downward in adjacent triangular element CFJ of the lower layer will emerge therefrom after incidence on the internal sides thereof at angles less than the critical angle (of about forty degrees). This construction, in which the triangular elements of the intermediate and lower layers have their bases in common (e.g., BC) is modified to provide the construction shown in the next view.

Figure 14:
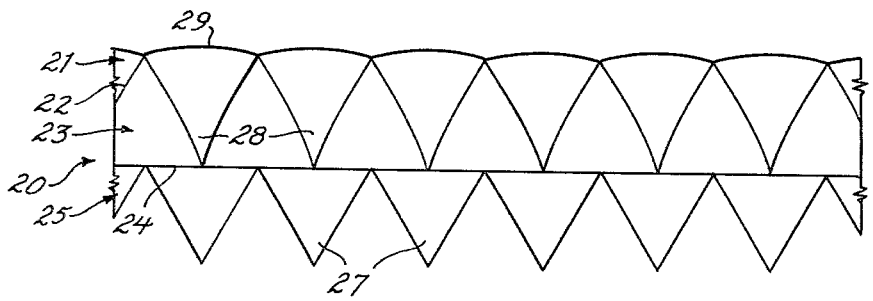
FIG. 14 is a schematic representation of the result of yet a further redesign of the light-transmitting assembly corresponding to the assembly shown in FIGS. 5 and 7.

FIG. 14 shows schematically the construction used in light-transmitting assembly 20 first shown, which differs from those of the intervening views by having the elements of the upper and lower layers located on a common set of axes rather than on separate sets of axes. This is preferable for convenient manufacture without introducing distortion into the desired configuration, which in three dimensions has a least interaxial spacing of three-fourths the base diameter of a conical element corresponding to a triangular element shown here, or $\frac{3}{4} s$, as shown in FIG. 6 (in which $s$ is the longest straight-line distance between apexes of a single hexagon, and $\frac{3}{4} s$ is the closest spacing of opposite sides of the hexagon).

FIGS. 15 to 18, inclusive, show schematically the passage of light rays through the preferred assembly shown as in FIG. 14. It will be understood that the views are terminated arbitrarily at the sides and that doubling back of the light rays at such side terminations does not indicate reflection and does not alter the result (except to transpose the rays laterally along the assembly for convenience in the showing). Reference characters are omitted from these views as superfluous. These views indicate four different categories of light paths through the assembly, as explained below.

Figure 15:
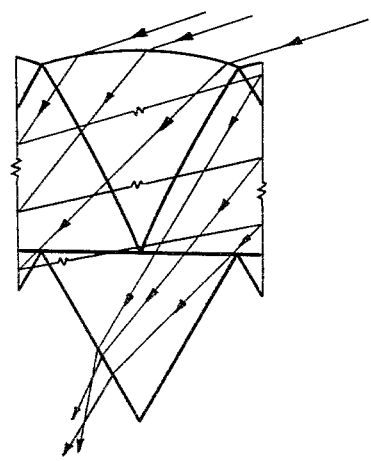
FIG. 15 is a schematic representation of the refraction of certain light rays by the light-transmitting assembly of FIG. 14.

FIG. 15 shows light rays that pass through the assembly while undergoing only refraction, not reflection. This includes essentially all the light incident on the top surface at angles from about forty-four to ninety degrees. The rays all emerge from the lower layer at angles (with respect to the nadir) not exceeding thirty degrees.

Figure 16:
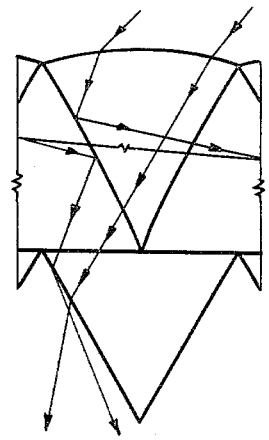
FIG. 16 is a schematic representation of the reflection and refraction of certain other light rays by the same light-transmitting assembly.

As shown in FIG. 16, at incidence angles of from about forty-four degrees to about thirty-eight degrees some of the rays will be reflected (at the interface between the upper and intermediate layers) as well as refracted; however, reflection from the upper face of that interface is followed by reflection from the lower face thereof, whereupon the ray passes through the planar interface between the intermediate and lower layers and out through the lower layer. Essentially all the light incident in this angular range is transmitted through the assembly, emerging at angles not exceeding thirty degrees, as desired.

Figure 17:
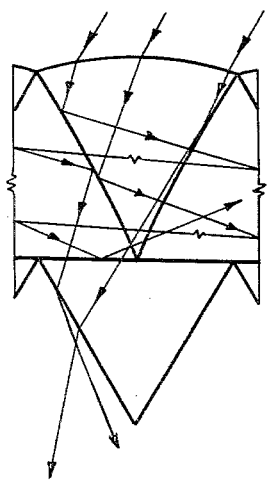
FIG. 17 is a schematic representation of the reflection and refraction of certain further light rays by the same light-transmitting assembly.

FIG. 17 shows reflection of some of the light from the planar interface between the intermediate and lower layers, as well as from the interface between the upper and intermediate layers. This is true of some of the light in the incidence range of from about thirty-eight to about twenty-one degrees. Much of this portion of the light eventually emerges from the top and the rest from the bottom of the assembly. The transmission of light in this incidence range is somewhat less than forty percent.

Figure 18:
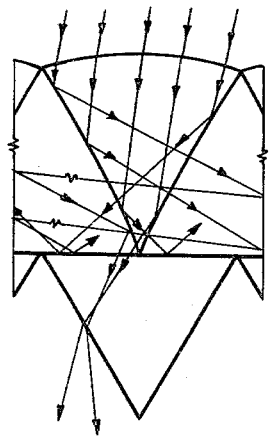
FIG. 18 is a schematic representation of the reflection and refraction of certain additional light rays by the same light-transmitting assembly.

As suggested by FIG. 18, most of the light incident at lower angles, such as in the range of from about twenty-one to about four degrees is reflected back toward the light source (not shown) and only about five percent of the total light incident therein eventually is transmitted by the assembly; of course, that transmitted light emerges at angles not exceeding thirty degrees. None of the light incident at angles from about four degrees to zero (vertical) is transmitted through the assembly.

The total transmission of the preferred light-transmitting assembly of this invention is made up of the primary transmission, which is what has been discussed in connection with FIGS. 15 to 18, and the transmission of light returned from the assembly toward the light source (most of which is reflected into the assembly again by the reflective housing of the lighting fixture). Some of the light so returned to the light-transmitting assembly will follow essentially the same path as before, but some of it will get through to constitute secondary transmission. This invention provides a primary transmission of about eighty-five percent, whereupon the secondary transmission is about fifteen percent of the reflectance (usually from about eighty-five to ninety percent) of the reflective coating of the lighting fixture. The total transmission, therefore, may approach ninety-eight percent, and even allowing for substantial absorptive losses in the fixture should exceed ninety percent by a goodly margin.

Not only does this light-transmitting assembly transmit nearly all the incident light (considered as being well distributed, as from a hemispherical source) but essentially all the transmitted light is confined to a conical zone within thirty degrees of the nadir, which is the desired glare-free range. Where more than negligible quantities of light can be tolerated outside this range, the preferred configuration may be modified somewhat (e.g., in its curvilinear characteristics) as to simplify construction. The illustrated embodiments are exemplary only, and modifications may be made therein while retaining certain of the advantages of the inventive concept, the invention being defined by the following claims.

The claimed invention:

1. Article of manufacture for use with a light source, comprising a multiplicity of light-refracting elements, including three solid elements located sequentially with respect to the source, the first element being closest thereto, the third being furthest therefrom, and the second being intermediately located and having its opposite surfaces juxtaposed to adjacent surfaces of the other two elements, the adjacent surfaces of the first and intermediate elements being characterized by respective interengaging protruding and intruding surface portions in essentially mating engagement with one another throughout, there being an interface pair defined by each two juxtaposed element surfaces such that essentially all light incident upon the interior surface of either adjacent element at an angle with respect to a perpendicular thereto less than the critical angle therein is transmitted essentially unaffected across the interface pair and into the other adjacent element, and essentially all light incident thereon at an angle greater than the critical angle is reflected back into the interior.

2. The article of claim 1 wherein the interfaces of the interface pair between the third and intermediate elements are essentially perpendicular to a shortest line from either interface to the light source.

3. In a manufactured article for transmitting and redirecting light from a light source, the combination of a conical light-refracting element having its base oriented toward the light source, a separate second conical light-refracting element having its base oriented toward the source and adjacent the apex of the first element, and a separate intervening light-refracting element fitting closely adjacent the conical surface of the first element and the base of the second element.

4. The article of claim 3 wherein each of the elements is a solid of revolution.

5. The article of claim 3 wherein the respective conical elements have a common axis.

6. The article of claim 3 wherein the conical surface of at least one of the respective conical elements forms an angle of 30° with the axis thereof.

7. The article of claim 3 wherein the conical surface of the second conical element forms an angle of 30° with the axis thereof, and the conical surface of the first conical element forms an angle of about 20° with the axis thereof at the apex and an angle of 30° with respect to the axis at the base thereof and is concave therebetween.

8. The article of claim 3 wherein the base of the first conical element is an elliptical surface of revolution.

9. The article of claim 3 wherein the index of refraction of each of the elements is about 1.5.

10. The article of claim 8 wherein the intersection of the base with a plane through the axis of the first conical element is a segment of an ellipse having foci located in a plane through the apex of the first conical element perpendicular to the axis of the element, each focus being spaced from the apex of the first element by a distance equal to the straight-line width of the base measured parallel to the plane.

11. The article of claim 3 wherein the conical surface of the first element is, in the vicinity of the apex, a concave parabolic surface of revolution being the locus of parabolic lines defined in a plane intersecting and rotated about the conic axis of the first element, each such having its focus at a location definable as being at the furthest edge therefrom of the base of a diametrically opposed adjoining like element having its conic axis parallel to the conic axis of the first element.

12. The article of claim 11 wherein the conical surface forms an angle of approximately 19° with the axis at the apex and curves parabolically outward therefrom until reaching an angle of 30° to the axis at about ¾ the distance from the apex to the edge of the base and remains constant at the latter angle over the remaining distance to the base.

13. Article according to claim 3 and comprising a multiplicity of the first conical elements arranged in a first layer with their bases mutually coplanar and their axes on centers arranged in a hexagonal pattern with a least interaxial spacing equal to ¾ the base diameter, a like multiplicity of the second conical elements arranged in a second layer with their bases mutually coplanar and with their axes on the same centers as the first elements, and an intervening separate layer of the intervening elements having one side adjacent the bases of the second layer and the other side adjacent the conical surfaces of the first elements, the intervening layer essentially filling the space between the first and second layers while remaining separate therefrom.

14. Prismatic light-transmitting assembly for use with a light source and comprising a multiplicity of first conical light-refracting elements arranged in a first layer with their bases mutually coplanar and oriented toward the light source and with their axes on centers arranged in a hexagonal pattern with a least interaxial spacing equal to ¾ the base diameter, a like multiplicity of second conical light-refracting elements arranged in a second layer separate from the first with their axes on the same centers and with the bases of the second conical elements oriented toward the light source and mutually coplanar adjacent the apexes of the first elements, and an intervening light-refracting layer separate from the other two and essentially filling the space between the first and second layers while remaining separate therefrom.

15. The article of claim 14 characterized further by the ability to concentrate essentially all the light transmitted thereby within a conical pattern having its apex oriented toward the apexes of the conical elements and its axis parallel to the axes of the conical elements and its sides inclined at an angle of 30° to its axis.

16. The article of claim 15 characterized further by a primary transmission of at least about 85% of the light incident on the first layer from the light source.

17. The article of claim 16 characterized further by a secondary transmission, when used with a reflective backing having a reflectance of X%, of essentially 15X%.

18. The article of claim 14 wherein the respective layers are retained in juxtaposition to one another by resilience of the first and second layers, which before assembly to the intervening layer assume a bowed configuration convex with respect thereto, and by retaining means about the peripheral edges of the layers, the retaining means being effective also to seal the peripheral edges and thereby preclude entry of foreign matter between adjacent layers.

19. Prismatic light-transmitting assembly comprising three discrete layers juxtaposed to one another and consisting of a first outer layer comprising a multiplicity of conical elements of one type located on centers arranged in a hexagonal pattern with a least interaxial spacing of ¾ their base diameter and oriented toward the middle layer in a common plane, a second outer layer comprising a multiplicity of conical elements of another type located on like centers and with their apexes oriented away from the middle layer and with their bases mutually coplanar and adjacent the plane of the apexes of the first conical elements, and a middle layer filling essentially all the space between the respective outer layers but remaining separate therefrom.

20. The article of claim 19 wherein the base surfaces of the conical elements of the first type are ellipsoidal, and the base surfaces of the conical elements of the second type are flat, and wherein in the elements of the first type the conical surface forms an angle of slightly less than 20° with the axis and an angle of approximately 75° with the base thereof and is concave in section therebetween, and in the conical elements of the second type the conical surface forms an angle of 60° with the base and an angle of 30° with the axis thereof and is flat in section therebetween.

21. In a manufactured article having a plurality of juxtaposed light-refracting elements for transmitting and redirecting light from a light source, a solid conical light-refracting element having its base oriented toward the light source, and a separate solid light-refracting element fitting closely adjacent the conical surface thereof, the base of the conical element being an elliptical surface of revolution, and the intersection of the base with a plane through the axis of the conical element being a segment of an ellipse having foci located in a plane through the apex and perpendicular to the axis of the conical element, each focus being spaced from the apex by a distance equal to the straight-line width of the base measured parallel to the plane.

22. In a manufactured article having a plurality of juxtaposed light-refracting elements for transmitting and redirecting light from a light source, a solid conical light-refracting element having its base oriented toward the light source, and a separate solid light-refracting element fitting closely adjacent the conical surface thereof, the conical surface being, in the vicinity of the apex, the locus of parabolic lines defined on the conical surface by intersection with a plane intersecting and rotated about the axis of the conical element, each such parabolic line having its focus at a location definable as being at the furthest edge therefrom of the base of a diametrically opposed adjoining like element having its axis parallel to the axis of the first element.

23. In a manufactured article having a plurality of juxtaposed light-refracting elements for transmitting and redirecting light from a light source, a solid conical light-refracting element having its base oriented toward the light source, and a separate solid light-refracting element fitting closely adjacent the conical surface thereof, the conical surface being, in the vicinity of the apex, the locus of parabolic lines defined on the conical surface by intersection with a plane intersecting and rotated about the axis of the conical element, each such parabolic line having its focus at a location definable as being at the furthest edge therefrom of the base of a diametrically opposed adjoining like element having its axis parallel to the axis of the first element and the conical surface forming an angle of approximately 19° with the axis at the apex and curving parabolically outward therefrom until reaching an angle of 30° at about ¾ the distance from the apex to the base and remaining constant at the latter angle over the remaining distance to the base.

24. In a manufactured article having a plurality of juxtaposed light-refracting elements for transmitting and redirecting light from a light source, a multiplicity of solid conical light-refracting elements arranged in a layer with their bases mutually coplanar and oriented toward the light source and with their axes on centers arranged in a hexagonal pattern with a least interaxial spacing equal to ¾ the base diameter, and a separate solid light-refrcting element fitting closely adjacent the conical surfaces of all the conical elements and having dependent from its base a multiplicity of additional conical elements coaxial with the first conical elements.

References Cited by the Examiner
UNITED STATES PATENTS

| | | | |
|---|---|---|---|
| 595,273 | 12/1897 | Soper | 88—28.93 X |
| 1,666,808 | 4/1928 | Buchner | 88—28.93 X |
| 1,943,995 | 1/1934 | Weld | 88—60 |
| 2,887,566 | 5/1959 | Marks | 240—106 X |
| 2,981,826 | 4/1961 | Mattern | 240—1 |

NORTON ANSHER, *Primary Examiner*,